US010513425B1

(12) United States Patent
Lassota

(10) Patent No.: US 10,513,425 B1
(45) Date of Patent: Dec. 24, 2019

(54) BEVERAGE DISPENSER WITH UNIVERSAL PORTABLE TOP-MOUNTED BEVERAGE CONDITION STATUS LIGHT INDICATOR, UNIVERSAL PORTABLE TOP-MOUNTED BEVERAGE CONDITION STATUS LIGHT INDICATOR AND METHOD

(71) Applicant: Food Equipment Technologies Company, Inc., Lake Zurich, IL (US)

(72) Inventor: Michael W Lassota, Wauconda, IL (US)

(73) Assignee: FOOD EQUIPMENT TECHNOLOGIES COMPANY, INC., Lake Zurich, IL (US)

(*) Notice: Subject to any disclaimer, the term of this patent is extended or adjusted under 35 U.S.C. 154(b) by 277 days.

(21) Appl. No.: 14/799,416

(22) Filed: Jul. 14, 2015

(51) Int. Cl.
*B67D 7/08* (2010.01)
*B67D 3/00* (2006.01)
*A47J 31/44* (2006.01)
*B67D 7/86* (2010.01)

(52) U.S. Cl.
CPC .......... *B67D 3/0058* (2013.01); *A47J 31/44* (2013.01); *B67D 7/86* (2013.01)

(58) Field of Classification Search
CPC ...... B67D 3/0058; B67D 7/86; B67D 1/0871; A47J 31/44; A47J 41/0094; A47J 31/50; A47J 31/56; G01F 23/74; G01F 23/265; G01F 23/268; G01F 23/263; B05B 12/004; B05B 12/124
USPC ......... 99/285; 222/23, 207, 113, 131, 146.5, 222/185.1, 192
See application file for complete search history.

(56) References Cited

U.S. PATENT DOCUMENTS

| | | | | |
|---|---|---|---|---|
| 3,124,003 A * | 3/1964 | Gorgens | ................... | G01K 5/62 374/198 |
| 3,504,316 A * | 3/1970 | Bekedam | ................ | G01F 23/56 335/306 |
| 4,104,916 A * | 8/1978 | Hofer | ....................... | G01K 1/04 374/206 |
| 4,527,909 A * | 7/1985 | Dale | ........................ | G01K 1/08 136/230 |
| 4,981,039 A * | 1/1991 | Hayashi | ................. | G01F 23/74 337/207 |

(Continued)

*Primary Examiner* — Charles Cheyney
(74) *Attorney, Agent, or Firm* — James W. Potthast; Potthast & Associates

(57) ABSTRACT

A self-contained, universal portable beverage condition status indicator (10) has relatively large and easily visible top light dome (30) that is selectively lighted to provide an indication as to when a beverage dispenser (12) to which it is mounted is empty of beverage. Mounting is performed without any tools or alteration to the dispenser by simply inserting an elongate sensor probe assembly (50) through an inlet (22) in the top of the dispenser (12) and down to a location adjacent the bottom (16) of the hollow body (14) of the dispenser. Tooless removal is accomplished by simply slidably lifting the indicator (10) upwardly and outwardly from the dispenser (12) until it is clear. It may then be used with a newly filled different dispenser (12). The sensor probe assembly remains functional even though lower portion may be removed. Score lines (64, 70, 65, 59, etc.) are provided to facilitate breaking off of the lower frangible sections (86) of the sensor probe assembly (50) in order to custom fit the indicator (10) to dispensers of different size or depth.

29 Claims, 4 Drawing Sheets

(56) References Cited

U.S. PATENT DOCUMENTS

| | | | | |
|---|---|---|---|---|
| 5,103,368 A * | 4/1992 | Hart | | G01F 23/266 |
| | | | | 361/284 |
| 5,674,009 A | 10/1997 | Stark | | |
| 6,062,126 A * | 5/2000 | Johnson | | A47J 31/52 |
| | | | | 340/309.7 |
| 6,289,731 B1 * | 9/2001 | Lo | | G01F 23/72 |
| | | | | 73/305 |
| 6,491,427 B1 * | 12/2002 | Takagawa | | A47J 31/50 |
| | | | | 374/141 |
| 6,702,153 B2 | 3/2004 | Nowak et al. | | |
| 6,708,598 B2 | 3/2004 | Lassota | | |
| 6,741,180 B2 * | 5/2004 | Lassota | | A47J 31/50 |
| | | | | 340/618 |
| 7,658,105 B2 * | 2/2010 | Holz | | B60K 15/0406 |
| | | | | 73/290 R |
| 7,681,446 B2 * | 3/2010 | Morimoto | | A47J 27/212 |
| | | | | 73/292 |
| 7,690,533 B2 * | 4/2010 | Stilley | | B05B 11/0005 |
| | | | | 222/113 |
| 7,712,364 B2 * | 5/2010 | Radhakrishnan | | A47J 31/50 |
| | | | | 73/304 C |
| 7,735,691 B1 | 6/2010 | Lassota et al. | | |
| 7,798,373 B1 * | 9/2010 | Wroblewski | | A47J 41/0033 |
| | | | | 222/1 |
| 8,176,778 B2 * | 5/2012 | Schoenmakers | | G01F 23/265 |
| | | | | 73/304 C |
| 8,397,560 B2 * | 3/2013 | De Sanzo | | G01F 23/0007 |
| | | | | 73/149 |
| 2003/0010215 A1 * | 1/2003 | Burkholder | | A47J 41/0088 |
| | | | | 99/285 |
| 2012/0293332 A1 | 11/2012 | Rosenfeld | | |
| 2014/0091935 A1 | 4/2014 | Rosenfeld | | |
| 2014/0332433 A1 * | 11/2014 | Lyall, III | | A47J 41/0094 |
| | | | | 206/459.1 |

* cited by examiner

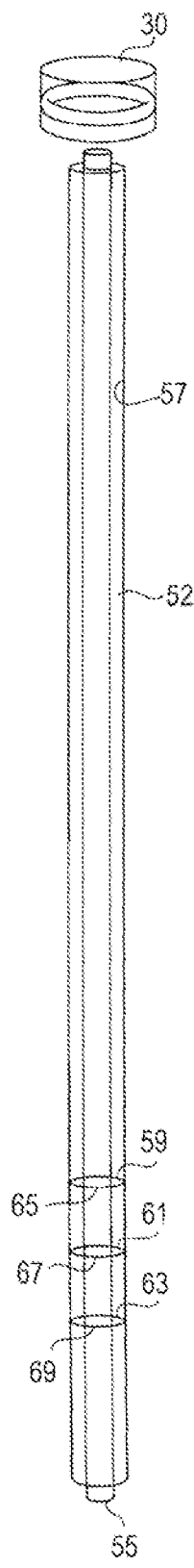
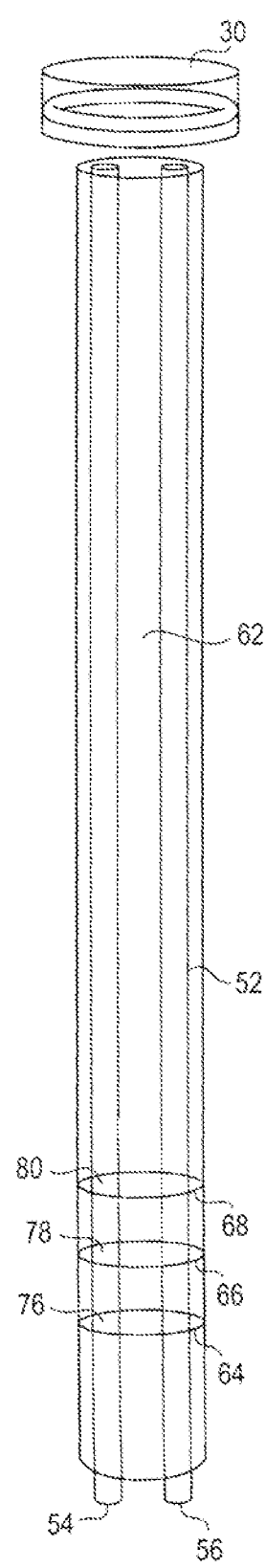
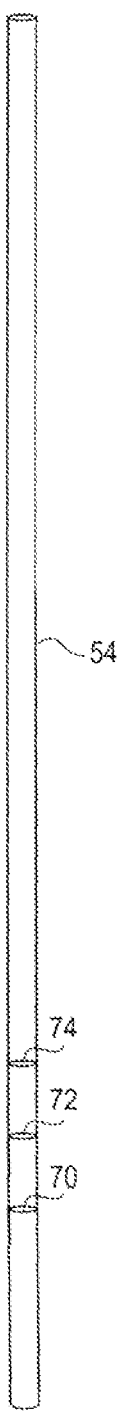

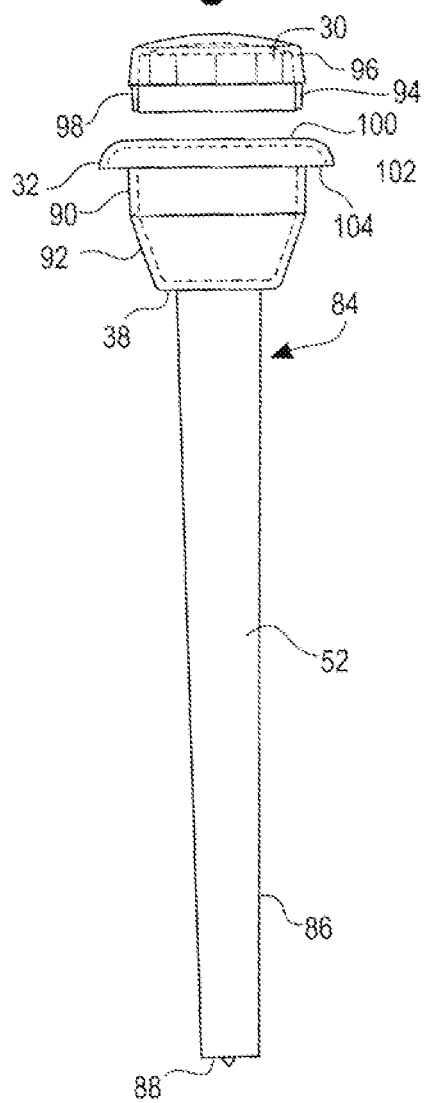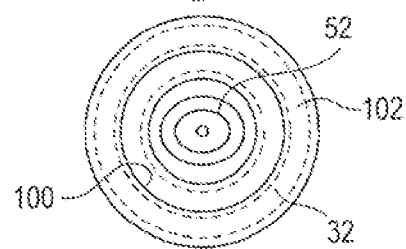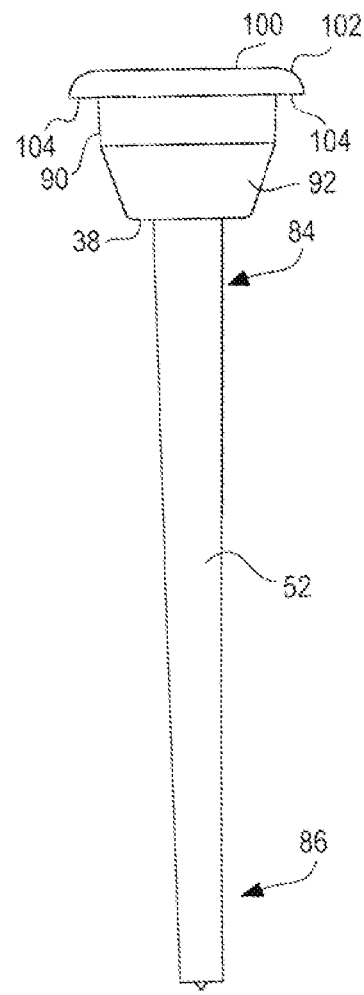

BEVERAGE DISPENSER WITH UNIVERSAL PORTABLE TOP-MOUNTED BEVERAGE CONDITION STATUS LIGHT INDICATOR, UNIVERSAL PORTABLE TOP-MOUNTED BEVERAGE CONDITION STATUS LIGHT INDICATOR AND METHOD

BACKGROUND OF THE INVENTION

Field of the Invention

This invention generally relates to commercial beverage dispensers, and, more particularly to such commercial portable beverage dispensers that receive freshly brewed beverage directly from an associated brewer and then are moved to a serving location with a plurality of other substantially identical dispensers.

Discussion of the Prior Art

It is well known to provide commercial beverage dispensers that are opaque with electronic beverage condition sensor assemblies which include built-in beverage sensing probes and beverage condition displays. The beverage conditions sensed include beverage level, or quantity; elapsed time since the dispenser was filled with freshly brewed beverage and beverage temperature. Typically, the beverage condition sensor assemblies employ laterally, outwardly facing LCD display panels or the like with graphic or numerical displays that indicate the beverage condition being sensed. While these display function well, because they face laterally outwardly and because of their relatively small size, the information on the panels, such as indications that the beverage dispenser is empty, has been sitting to long for the beverage to still be fresh or has fallen beneath an acceptable minimum temperature, they may only be seen from the one side of the beverage dispenser to which they are mounted and the display information read from a position that is close to the dispenser, perhaps only a few feet.

In commercial venues, in which wait staff are the persons who draw beverage from the dispensers either into insulated carafes or individual serving cups for delivery and service to customers, such as in a sit down restaurant, a hotel dining room, a convention hall and the like, each time the staff go to the dispenser to dispense some of the beverage, they are able to see the display and read the beverage status information being displayed.

However, there are now many self-serve venues, such as automobile service station marts, in which beverage is drawn from the beverage dispenser only by the customers, themselves, in such venues, the staff person is often stationed at a cash register location or other location that is too distant from the beverage dispenser or is at such a side viewing angle relative to the display, that the display cannot be read or even seen by the staff. Some beverage dispensers also have no display of beverage condition or status. In either of these situations, even if the dispenser has a sensor and a beverage condition display, the only way that the staff person can independently determine whether any one of sometimes several beverage dispensers is empty or otherwise needs to be replaced with another beverage dispenser with a fresh batch of beverage is by periodically leaving their work station, such at a cash register, and moving sufficiently close to the beverage dispenser to enable reading of the beverage condition or status provided on the side facing LED display, or if there is no display, by opening the top of the beverage dispenser and looking inside or lifting the dispenser to judge by weight whether it needs to be replaced with a newly filled dispenser or be refilled, itself.

SUMMARY OF THE INVENTION

Because of the disadvantageous circumstance noted above, the inventors have determined that there is a need for an improved way for conveying information to a staff person of the beverage condition within a commercial beverage dispenser, particularly in a self-serve venue.

It is therefore an object of the present invention to provide improved apparatus and methods to enable sensing the condition of a beverage within an opaque beverage dispenser from distant or laterally located positions.

This objective is achieved in part by providing a beverage dispenser having an opaque hollow insulating body extending between a closed bottom and an open top, a removable top closure including an inlet for receipt of beverage into the hollow body, with a beverage status indicator having a light dome overlying the funnel with a body having a closed top, an outwardly facing side wall that is at least partly transparent or translucent, an electronics housing with a bottom and a top connected to an underside of the light dome, said electronics housing protectively surrounding at least one status indicator lamp contained therein beneath the light dome facing upwardly to shine light upwardly into the light dome, a power supply and a controller responsive to at least one condition of the beverage to selectively energize the status indicator lamp, and a sensor probe assembly with an elongate sensor probe housing extending downwardly from the electronics housing and through the inlet to a distal end located adjacent the closed bottom and protectively surrounding at least one elongate sensor probe for sensing the at least one condition of the beverage with a distal end located adjacent to the closed bottom, and means for connecting the sensor probe to the controller.

Preferably, the beverage dispenser includes a funnel assembly with a sensor probe for sensing said beverage condition and carrying a laterally outwardly facing electronic display for displaying the status of said at least one condition of the beverage sensed by the elongate probe. If the funnel assembly has a funnel and a down-tube extending downwardly from the funnel to a distal end adjacent the closed bottom to convey beverage received by the funnel to a location adjacent the closed bottom, then at least one of the elongate sensor probe housing and the elongate sensor probe is frangible to facilitate shortening by breaking off an end portion and is protectively surrounded by the down-tube. Preferably, both of the elongate sensor probe body and the elongate sensor probe are frangible to facilitate shortening by breaking and are protectively contained within the down-tube. The frangible probe housing and probe are also preferably scored with pre-weakening grooves to facilitate breaking at the grooves.

In the preferred embodiment, the electronics housing has a timer to selectively cause the sensor lamp to blink on and off to indicate at least one status of the beverage condition. Also, another status indicator light having a color different from a color of the one status indicator lamp may be provided and the controller selectively energizes only one of the one status indicator lamp and the other status indicator lamp in response to different status conditions sensed by the sensor probe.

The object of the invention is also obtained in part by providing a beverage status indicator assembly for use with a beverage dispenser having an opaque hollow insulating body with a surrounding sidewall extending between a closed bottom and a top with an inlet for receipt of beverage into the hollow body, the improvement being a beverage status indicator assembly, having a status indicator light dome with an interior defined by a closed top and surrounding side wall with at least a portion that is translucent or transparent to enable the transmission of light within the light dome laterally outwardly from the surrounding side wall, a beverage status lamp for providing light within the interior of the status indicator light dome when energized, an electronics housing with a power supply and a controller responsive to at least one condition of the beverage to selectively energize the status indicator lamp to indicate beverage status, a frangible sensor assembly mounted to and extending downwardly from the electronics housing, said frangible sensor assembly including an elongate frangible sensor probe housing extending downwardly from the electronics housing to a lower end portion adjacent the bottom of the hollow body, said lower end portion being frangible to enable shortening of the lower end portion, and an elongate frangible sensor probe connected with the controller and protectively mounted within and protectively, substantially surrounded by, at least the frangible lower end portion of the frangible sensor stem housing and connected to the electronics housing, said elongate frangible sensor probe having a bottom located within the lower end portion of the elongate sensor stem housing that is also frangible to facilitate shortening of the bottom portion of the frangible sensor probe, and means for supporting the status light dome above the top with the frangible sensor stem housing extending downwardly through the inlet into the hollow body from adjacent the top of the hollow body to adjacent the bottom of the hollow body.

Preferably, the frangible lower end portion of the elongate frangible sensor stem housing has at least one of (a) a groove scored in the lower end portion of the sensor stem housing to facilitate manual breaking off of a part of the lower end portion of the stem housing at the location of the scored groove, or (b) a plurality of grooves scored in the lower end portion of the of the stem housing at a plurality of locations spaced along the lower end portion to facilitate breaking off a part of the lower end portion of the stem housing at said plurality of locations. In the preferred embodiment, the frangible lower end portion of the elongate frangible sensor probe housing has at least one of (a) a groove scored in the lower end portion of the elongate frangible sensor probe to facilitate manual breaking off of a part of the lower end portion of the frangible sensor probe at the location of the scored groove, or (b) a plurality of grooves scored in the lower end portion of the of the frangible sensor probe at a plurality of locations spaced along the lower end portion of the frangible sensor probe to facilitate breaking off a part of the lower end portion of the elongate frangible sensor probe stem housing at said plurality of locations spaced along the sensor probe. Also, for every scored groove in the elongate frangible sensor stem housing there is a corresponding scored groove in the elongate frangible sensor probe.

Additionally, preferably the beverage within the hollow body has a level, and the elongate frangible sensor probe senses the beverage level, and the controller responds to the frangible sensor probe sensing of the different status conditions of the level by controlling the beverage status lamp in different ways, including (a) flashing the lamp at a relatively slow rate when the level is above an empty level, (b) flashing the lamp at a relatively fast rate that is substantially faster than the relative slow rate when the level is beneath at or beneath an empty level, (c) removing energy from the lamp so that no light is emitted from the status indicator light dome. There may also be another beverage status lamp that produces light of a color that is different from a color of the one beverage status lamp, and the controller responds to empty and non-empty status conditions of the beverage within the hollow body to energize the one beverage status lamp or the other beverage status lamp, respectively.

When the beverage status indicator assembly is combined with a beverage dispenser, the status indicator assembly is mounted to the beverage dispenser with the status indicator light dome being mounted above the top, and the inlet opening and the elongate frangible sensor stem housing extends through the inlet opening and into the hollow body to a location adjacent the closed bottom.

The objective of the invention is also acquired by providing a method of providing beverage status indication to a beverage dispenser having an opaque hollow insulating body extending between a closed bottom and a top with an inlet opening for receipt of beverage, by performance of the steps of bringing a length-alterable beverage sensor assembly with a beverage status light dome, a controller and power supply and an elongate length-alterable sensor probe within an elongate length-alterable sensor probe housing to a location of a beverage dispenser, determining if the elongate length-alterable sensor probe and elongate length-alterable sensor probe housing are too long to enable mounting the length alterable beverage sensor assembly to the beverage dispenser with the light dome adjacent an outer upwardly facing surface of the top and the elongate length-alterable sensor probe and length-alterable sensor probe housing extending through the inlet into the hollow body with distal ends of the probe and probe housing located adjacent the bottom and removing a portion of the distal ends of the length-alterable sensor probe and the length alterable sensor probe body as needed to enable locating the light dome adjacent the outer upward facing surface of the top when the distal ends are adjacent the close bottom of the hollow body.

Preferably, the at least one of the length-adjustable probe and the length adjustable probe housing is frangible, and the step of removing is performed by breaking off a piece of the distal end. The step of providing the scored groove may be done either (a) at the location of the beverage dispenser, or (b) at a site of manufacturing of the probe and probe body prior to bringing the length-alterable beverage sensor assembly to the beverage dispenser location. Preferably, both of the length-adjustable probe and the length-adjustable probe body are frangible, and the step of removing is performed by breaking off a piece of the distal end.

Preferably, one of the length-adjustable probe and the length adjustable probe housing has a scored groove, and the step of removing is performed by breaking off a portion of the distal end at the location of the scored groove. Further, both of the length-adjustable probe and the length adjustable probe housing have scored grooves, and the step of removing is performed by breaking off a portion of the distal end at the location of the scored grooves.

The objective of the invention is also achieved in part by a method of providing an indication of when an opaque beverage dispenser if empty of beverage, by performance of the steps of filling the dispenser with a beverage through an inlet in a top of the dispenser, after the dispenser is filled, toolessly mounting a self-contained beverage level status indicator assembly to the dispenser with a light dome on the top of the dispenser and an elongate sensor probe assembly extending through the inlet to a point slightly above but adjacent to a bottom surface of a hollow body of the dispenser, monitoring the level of beverage within the hollow body with the sensor probe assembly, conveying an electrical signal to a controller outside of the hollow body, and responding to the electrical signal with the controller to selectively light the light dome in response to the electrical signal to visually indicate when the beverage condenser is empty or not.

BRIEF DESCRIPTION OF THE DRAWINGS

The foregoing objectives and advantageous features of the present invention will be described in detail in and other objects and advantageous features will be described below with reference to the several figures of the drawings, in which:

FIG. 3 is a schematic sectional side elevation view of the sensor probe housing and sensor probe of one embodiment of the status light indicator of the present invention in which a single probe within an elongate, tubular probe housing is used to detect the status of the beverage condition;

FIG. 4 is a schematic sectional side elevation view of the sensor probes housing and sensor probes of another embodiment of the status light indicator of the present invention in which a pair of elongate probes encased within an elongate solid probe housing is used to detect the status of the beverage condition;

FIG. 5 is a schematic illustration of one of the probes of FIGS. 3 and 4;

FIG. 6 is an exploded side elevation view of a preferred embodiment of the portable beverage status light indicator of the present invention showing the light dome removed from the electronics housing;

FIG. 7 is a plan view of the universal portable beverage status light indicator of FIG. 6;

FIG. 8 is a side elevation view of the universal beverage condition status light indicator of FIG. 6;

DETAILED DESCRIPTION

Figure 1:
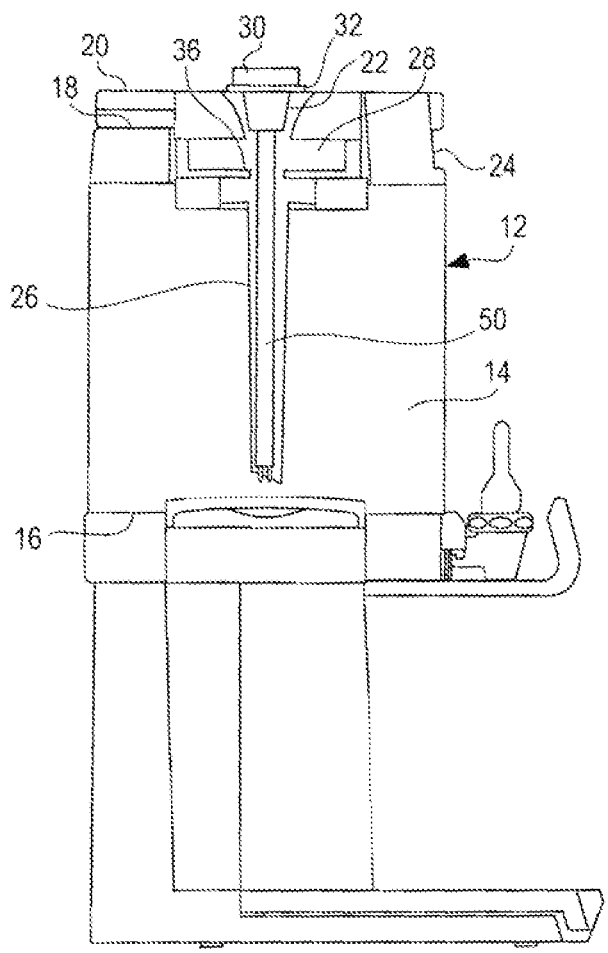
FIG. 1 is a sectional side elevation view of a faucet-type commercial beverage dispenser employing the universal, portable, top-mounted beverage condition status light indicator of the present invention.
Figure 2:
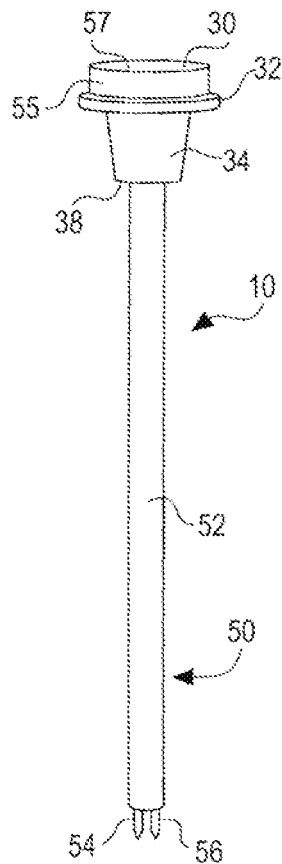
FIG. 2 is a front elevation view of the of the portable status light indicator of FIG. 1.

Referring first to FIGS. 1 and 2, a commercial beverage dispenser 12 is shown employing the universal portable top-mounted beverage status light indicator, or portable beverage status indicator, 10 of the present invention. For detailed information about this commercial dispenser 12 and the associated beverage condition sensing funnel assembly and condition display reference should be made to U.S. Pat. No. 6,702,153 issued Mar. 9, 2004 to Nowak et al; U.S. Pat. No. 6,708,598 issued Mar. 23, 2004 to Lassota; U.S. Pat. No. 7,735,691 issued Jun. 15, 2010 to Lassota et al., all of which are incorporated by reference.

Briefly, the beverage dispenser 12 has an opaque, stainless steel hollow vacuum insulating body 14 extending between a closed bottom 16 and an open top 18. A removable top closure 20 of the open top 18 includes an inlet 22 for direct receipt of beverage into the hollow body 14. A funnel assembly has a funnel 28 beneath the inlet and a down-tube 26 extending downwardly from the funnel 28 to a location adjacent the closed bottom 16 to convey beverage received through the inlet to the closed bottom 16 and a laterally outwardly facing liquid crystal display 24. The down-tube has level sensing ability and the level is graphically shown on the display 24 along with elapsed time since the dispenser 12 was refilled with freshly brewed beverage. The display does display a plurality of different levels between full and empty. Unfortunately, however, the display 24 can only be easily read from a position directly in front of the display 24 and, even then, cannot easily be read except from a few feet away.

Accordingly, the portable beverage status indicator, or status indicator 10 may be used to provide an indication as to whether the hollow body 14 is not empty or empty in a bold way that is visible from all angular positions including positions beneath the level of the top of the closure 20. The portable status indicator 10 has a large cylindrical light dome 30 that is preferably of prism-cut translucent plastic, such as polypropylene or acrylic butyl styrene, or ABS.

The prism-cut surface causes light to both reflect and refract in random patterns when lit internally to create the appearance of a generally uniform glow regardless of the angle from which the dome is viewed akin to a typical bicycle reflector except it transmits instead of reflects. Suitable plastics for the light dome include polypropylene and acrylic butyl styrene, or ABS. Located directly beneath the dome 30 is an annular support and inlet closure collar 32 that extends radially outwardly from the top of an electronics housing 34 beneath the collar 32.

The width and height of the light dome 30 is substantially greater in size than a single LED indicator light or the like by almost two orders of magnitude with a height of the dome 30 and the collar having a combined length of at least eight to nine inches. The collar 32 has a diameter of approximately one to two inches and a thickness, or height, of one-half inch. Thus, as seen in FIG. 1 when the portable status indicator 10 is mounted to the dispenser 12 with the collar 32 resting upon the top surface of the closure 20, the light dome 30 may be seen clearly from any lateral position including some positions even beneath the level of the top surface of the closure 20. This is particular beneficial when the portable status indicator is used in a venue in which the operator, or staff, may have a work station that is several feet or further from the beverage dispenser 12 and may be seated such that their viewing position is beneath the top surface of the closure 20.

Figure 11:
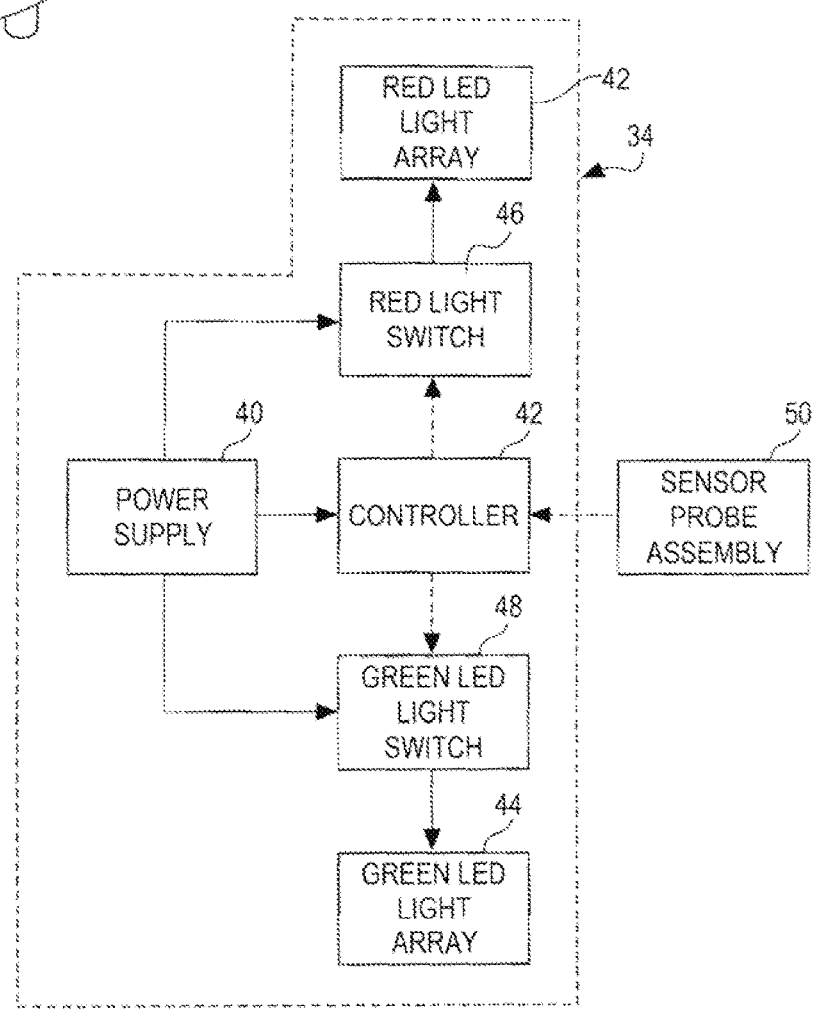
FIG. 11 is a functional block diagram of the components located within the electronics housing and the connected sensor probes of the universal beverage status light indicator of the present invention.

The electronics housing 34 has a downwardly, inwardly tapered body that generally conforms to and is received within the funnel 36, FIG. 1. Referring to FIG. 11, the electronics housing 34 has circular cross-section with a bottom 38 and a top wider than the bottom 38 that is substantially equal in diameter to the open circular bottom of the light dome 30, and attached to the underside of the collar 32 and the bottom of the light dome 30. Referring also to FIG. 11, the electronics housing 34 protectively envelopes a portable D.C. power supply 40, a controller 42 and two LED light arrays, a red light array 44 and a green light array 44. The electronics housing also encloses a red light switch 46 and a green light switch 48. The red light switch 46 and the green light switch receive control signals from the controller 42, to selectively connect power from the power supply 40 to and thereby energized and light the status indicating red LED array and the status indicating green LED array 48, respectively. The controller is responsive to at least one condition of the beverage, such as whether the dispenser 12 is empty or not empty, as indicated to the controller 42 by one or more of sensor probes of the sensor probe assembly 50. While the colors or red and green are used other colors could also be used. Also, the invention can be implemented with only a single LED array of any or no color that is caused to intermittently flash until the dispenser is empty or near empty. When no flashing is seen, then the service staff know it is time to remove and replace the dispenser.

Referring again to FIGS. 1 and 2, the sensor probe assembly 50 includes an elongate sensor probe housing 52 and one or two substantially identical elongate sensor probes 54 and 56. The elongate sensor probe housing 52 extends downwardly from the bottom 38 of the electronic housing 38 and extends through the inlet 22 to a distal end located adjacent the closed bottom 16 of the hollow dispenser body 14. The elongate sensor probe housing 50 protectively surrounds the elongate sensor probes 54 and 56 which are also connected at their upper ends to the controller by any suitable means that enables to the controller to correctly respond to changes in condition of the probes 54 and 56.

In the embodiment of FIGS. 1 and 2, when the hollow body 14 is not empty of beverage the measured resistance between the two probes 54 and 56 is relatively low due to the conductivity of the beverage in contact with both probes. However, when the hollow body has been emptied to the point where there is no longer any beverage between and in contact with both probes, the resistance between the probes 54 and 56 beverage increases dramatically relative to the resistance when beverage is present. This difference in resistance is detected by the controller 42 which acts accordingly to selectively energize one or the other light arrays 42 and 44. While the embodiment being describe herein only detects whether the hollow body is empty or not, it is contemplated that one or more other types of sensors may be employed either individually or together to detect the status of different characteristics of the beverage other than only presence or absence of the beverage.

Such other conditions and sensors may include photosensors to measure opacity of the beverage or absence or presence of the beverage. Also, a turbidity sensor could be employed to sense whether the beverage has become stale. In addition to directly sensing of the presence of the beverage, the elapsed time since the universal portable status indicator was installed, or mounted, could be measured within the electronic controller to provide an indirect indication of temperature have fallen beneath a preselected service minimum or the temperature itself could be sensed for this same purpose.

As seen in FIG. 1, the elongate probe assembly housing 50 of the probe assembly and the enclosed sensor probes 54 and 56 are simply passed through the open top of the funnel 36 through the inlet 22 and down the interior of the hollow funnel down-tube 26 to adjacent the closed bottom 16. Thus, the invention is easy-to-use and intuitively simply inserted without tools or modification to the dispenser. This invention is also designed to be universally used with any make or model gravity type dispenser.

Advantageously, installation is performed without the use of any tools, the need for complicated installation instructions or the possession of special or technical knowledge by the installer. Equally importantly, the universal portable condition status indicator may be simply uninstalled without the use of any tools, etc. simply by manually grasping the light dome 30 and pulling the condition status indicator 10 upwardly and away from the dispenser until it is clear.

The universal portable beverage condition status indicator after being removed from an empty dispenser can then be used with a filled replacement dispenser, thus advantageously eliminating the need for a status indicator for each individual dispenser that may be in use.

The elongate sensor probe housing 52 and the elongate sensor probes 54 and 56 are protectively contained within the down-tube. As previously indicated this is accomplished without interfering with the normal level sensing function performed by level sensors (not shown) carried by the down tube 26 to provide level information that is graphically shown on the display 24. The cross-sectional size of the elongate probe housing 52 is less than that of the down tube or preferably has an oval shape to insure that there is sufficient space or gaps between the cylindrical down-tube 26 and the elongate probe housing 52 to enable beverage to pass through the down-tube 26 to the bottom 16.

As will be described in greater detail below, in keeping with another important aspect of the invention, the probe housing 52 and elongate sensor probes 54 and 56, the lower or bottom distal end portions of the sensor probe assembly 50 are frangible to facilitate shortening of the distal bottom end portion of the sensor probe assembly to fit correctly with beverage dispensers with hollow bodies of different depth. Accordingly, even though the lower end portion of the elongate sensor assembly 50 is frangible, by enclosing it within the down-tube 26 the possibility of accidental breaking is substantially reduced.

Although the red light diode display 42 and the green light diode display 44 could be mounted within the light dome 30, preferably they are mounted at the top of the electronics housing but still contained within the electronics housing 34, beneath the light dome 30 and collar 32 so that no wires or other electrical connectors need to enter the light dome. Instead, the two light arrays within the electronics housing 34 point or face upwardly from the top of the electronics housing 34 to shine light upwardly into the light dome 30. As noted, the outwardly facing side wall 55 has prism like qualities or features that both refract and reflect light to enhance visibility of the light dome when being provided with internal light from the status indicator LED arrays 42 and 44.

After beverage is brewed directly into the dispenser 12, the presence of the beverage is detected by the sensor probes. This non-empty status condition causes the controller 42 to cause the green LED array 44 to slowly blink intermittently, such as every thirty seconds. Later, when the sensor probe assembly 50 indicates to the controller that the dispenser 12 is empty, the green LED array 44 is de-energized and the red LED array 42 is energized to flash rapidly, such as once per second for a preselected time duration, such as one minute, and then is turned off to conserve energy while at the same time still providing an empty indication indicated by the absence of any green light or any light, whatsoever. Once there is a red light flashing or the absence of green light flashing slowly, the staff can easily see from a distance and at any viewing angle that the dispenser 12 is empty.

The collar 32 functions as a retention member located intermediate the top 57 of the electronics housing 34 and the light dome to protectively cover a the upwardly facing opening of the inlet 22. In addition, the collar also performs another function of supporting the light dome 30 over the open top surface of the closure 18 which is also the top of the entire dispenser 12 to facilitate easy visibility of the light dome from location located laterally from the beverage dispenser, as noted above.

Referring to FIG. 4, the elongate probes 54 and 56 are embedded within a solid body 62 made of polypropylene. Both of the two elongate sensor probes are preferably two stainless steel rods having a diameter of 1.5-mm that are imbedded in the solid polypropylene plastic body 62 and then surrounded by the sensor probe housing 52, which may also be made of the same sold polypropylene plastic.

Preferably, the lower distal end portions of both the housing 52 and the two probes 54 and 56 have annular grooves that have been scored into the outer surfaces of each prior to being embedded into the solid body 62. Score lines 64, 66 and 68 are in formed in the lower distal end portion of the housing 52 and corresponding score lines 70, 72 and 74, and 76, 78 and 80 are formed in the elongate sensor probes 56 and 54, respectively. Preferably, each of the groups of three score lines 64 70 and 76, 66, 72 and 78 and 68, 74 and 80 are aligned with one another. Alternatively, each of the aligned pair of score lines formed in the sensor probe housing 52 are placed at locations slightly above the corresponding score lines in the elongate sensor probes to enable more exposure of the probes beneath the sensor probe housing 52. These score lines are preferably formed during manufacture of the portable status indicator.

These score lines render the lower end portion of both the housing 52 and the elongate sensor probes 54 and 56 sufficiently frangible to enable breaking off lower end portions of both the elongate sensor housing 52 and the elongate sensor probes 54 and 56. In the absence of the score lines being formed at the site of manufacture, they may be formed at any selected location with a scoring tool, such as a triangular file, pipe fitters scoring tool or the like at the site of installation of the portable status indicator 10 to custom fit it to the beverage dispenser that is being fitted.

In any event, once the score lines are formed, either at the site of manufacture or at the site of installation, the housing and probes may be broken off at the score lines either by lateral tapping or by manually bending forces manually applied at opposite sides of the score line. In the absence of score lines, the pieces at the bottom distal ends of the elongate sensor housing 52 and elongate sensor probes 54 and 56 may simply be cut off with a cutting tool, such as a hack saw. Because the sensor probes 54 and 56 and elongate, even when an end piece is removed, the remainder of the sensor probe body now exposed to contact with the beverage will function equally as well as the exposed end portions of the sensor probe that was removed. In lieu of such elongated probes a plurality of shorter incremental probes, each separately connected to the controller and distributed along the length of the lower portion of the elongate sensor probe housing.

Referring to FIG. 3, another embodiment of the sensor probe assembly 50 is shown in which the sensor probe housing is hollow and on a single elongate probe 55 is employed. In such case the interior of the housing 52 is provided with an electrical coating 57 to serve as the second probe. The resistance between the probe 55 and the electrically conductive coating 57 is measured to determine whether beverage is present between the probe 55 and the coating 57. As with the dual probe embodiment of FIG. 4, score lines 59, 61 and 63 are provided in the sensor probe housing 52, while respectively corresponding score lines 65, 67 and 69 are provided in the probe to increase fragility and facilitate shortening by breaking.

As seen in FIGS. 6, 7 and 8, in a preferred embodiment of the portable elongate status indicator 10, the elongate probe housing has an upper end portion 84 located adjacent the inlet opening and opposite the distal end portion 86 with walls that are thicker than walls of the distal end portion 86. Accordingly, the upper end portion 84 is less frangible and stronger than the distal end portion 86 even without the presence of score lines. The elongate sensor probe housing 52, which is preferably oval in cross-sectional shape, is generally evenly tapered from the upper end at the underside 38 of the electronics housing, at which the major axis is one inch at the juncture with the bottom 38 of the electronics housing 34, to one-half inch at the bottom end 88. Alternatively, the elongate probe housing 52 may be unevenly tapered with a steeper inward downward taper, such as one not beginning until the midpoint of the sensor probe housing 52, The electronics housing 34 has a lower section 92 that has a downwardly inwardly, preferably truncated conical taper and the upper mounting section 90 has a cylindrical shape. The truncate conical taper of the lower section 92 is conformed to the shape of the conical funnel assembly 36 to provide a stable uniform supportive nesting on top of the funnel 36 beneath the top surface of the closure 20. The upper section 90 is cylindrical to provide for a snug fit with a lower cylindrical mounting section 94 of the light dome 30. The mounting section has an inner diameter that is slightly less than the diameter of the lower cylindrical section 96 of the light dome 30 to create at their juncture an annular support shoulder 98.

The light dome 30 is mounted to the top of the electronics housing 34 by inserting the lower cylindrical lower mounting section 96 of the light dome 30 into the cylindrical open top 100 and then sliding section 96 downwardly until the mounting support shoulder 98 is pressed against the top of the collar 32 which also coincides with the top of the housing 34 and preventing any further downward lowering of the light dome 30. The dimensions of the outer diameter of the lower mounting section 94 and the inner diameter of the opening 100 are such as to ensure a snug frictional fit. Preferably, the fits is sufficiently snug that adhesive is not required to hold the mating sections 94 and 90 together to enable the light dome to be easily manually removed to gain access to the electronics housing 34 to repair any of the electronics within the housing 34 or to change a battery of the power supply 40 and then easily remounted.

The collar 32 in the preferred embodiment shown in FIGS. 6-8 the collar 32 is formed by a thin wall that is downwardly, outwardly curved from the top 100 to a circular bottom edge 104. The curve of the upper surface of the curved wall functions to provide greater lateral rigidity to the mounting of the indicator 10. On the other hand, the bottom edge 104 fits around and covers the inlet opening to reduce the escape of heat from the interior of the hollow body through the inlet 22 in addition to supporting the light dome 30 above the top surface of the closure 20. In addition, as shown in FIG. 9, in some dispensers, annular inlet retention wall 106 surrounds the inlet 22, and in such cases, the curved collar still is able to have the bottom annular edge rest on the top surface 108 of the dispenser 12 by fitting around and over the annular inlet retention wall 106, and as best seen in FIG. 10.

Figure 9:
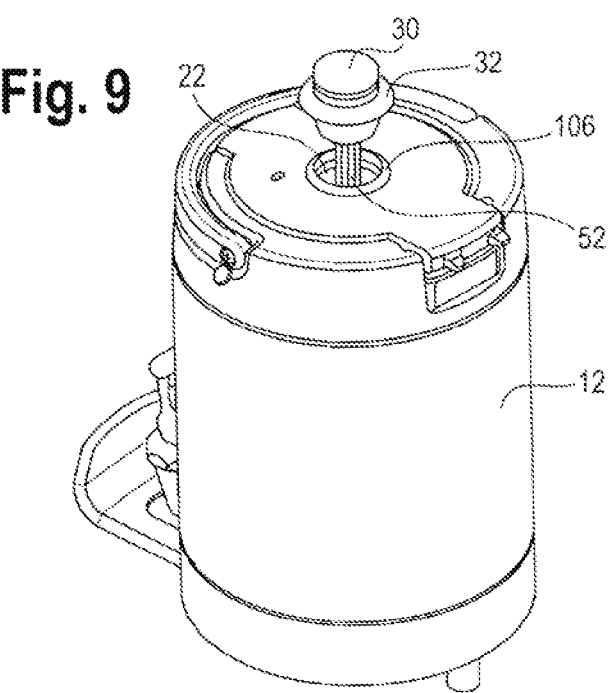
FIG. 9 is a perspective view of a beverage dispenser employing the universal portable beverage condition light indicator of the present invention before the sensing probe and probe housing are shortened by breaking or otherwise.
Figure 10:
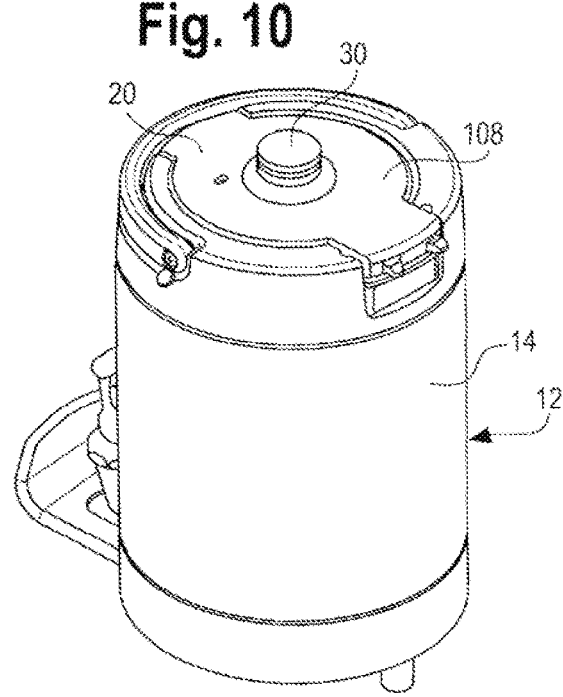
FIG. 10 is a perspective view of the beverage dispenser of FIG. 11 after the elongate sensing probe and probe housing have been shortened to enable the light dome to rest on top of the beverage dispenser in which a collar beneath the light dome covers the inlet opening.

Referring now to FIGS. 9 and 10, in accordance with one aspect of the invention, a method is provided to enable custom fitting of the universal portable status indicator to ensure proper mounting of the portable status indicator 10 when the dispenser 12 has a depth from the top to the bottom that is less than the distance between the bottom of the collar 32 and the interior surface of the closed bottom 16. This method enables the provision of a highly visible beverage status indication to a beverage dispenser 12 having an opaque hollow insulating body 14 extending between a closed bottom 16 and a top 20 with an inlet opening 100 for receipt of beverage. This is accomplished by first bringing a length-alterable universal portable beverage sensor assembly 10 with a beverage status light dome 30, a controller 42 and power supply 40 and an elongate length-alterable sensor probe, such as sensor probes 54, 56 or 55 within an elongate length-alterable sensor probe housing 52 to a location of a beverage dispenser 12. The probe and probe housing may be length-adjustable because of one or more of the presence of score lines, that facilitate breaking off a distal end piece of both the housing 52 and the probe, because due to the material and the cross section size of the probe assembly 50 the lower end portion is naturally frangible and easy to break off, score and break off or simply cut of with a cutting tool.

Once the universal portable beverage condition indicator 10 arrives at an installer arrives at the customer site at which the dispenser 12, a determination is made as to whether the elongate, length-alterable sensor probe, such as probe 55, FIG. 3, and elongate length-alterable sensor probe housing 52 are too long to enable mounting the length alterable beverage sensor assembly to the beverage dispenser 12 in the preferred mounting position.

When in the preferred mounting position, the bottom edge of the collar resting on the top surface of the dispenser and closing off the inlet opening 22, such as upper surface 108, FIG. 10, and with the elongate length-alterable sensor probe and length-alterable sensor probe housing 52 extending through the inlet 22 into the hollow body 14 with distal ends of the sensor probe and probe housing located adjacent to, but not touching the interior surface 16 of the of the hollow body 14. If the two electrodes touch the stainless steel interior surface of the hollow body 14, they will always indicate a resistance between them as zero, falsely indicating that beverage is present even when it is not.

On the other hand, this problem can be avoided by recessing the end of the sensor probe or probes spaced inwardly from an open distal end of the probe housing, so that the indicator 10 may be used without any shortening even if it is too large for flush mounting as shown in FIG. 10, but can be used in an elevated position such as shown in FIG. 9 In such case another annular collar slidably mounted on the body of the sensor housing and placed over the inlet opening after insertion mounting of the sensor probe assembly 50. While this may not be the most aesthetically pleasing mounting, it advantageously elevates the light dome 30 to a higher elevation where it can be more easily seen, especially at viewing locations beneath the level of the top of the dispenser. Alternatively, a removable plastic footing could be mounted to the sensor probe housing 52 to keep the electrodes spaced from the stainless steel interior surface.

This determination may be simply made by attempting to mount the status indicator 10 to the dispenser 12 to see if the desired relationship can be obtained, such as illustrated in FIG. 9. Alternatively, length measurements or estimates may be made to make this determination. If is determined that the sensor probe assembly 50 is to large for the dispenser 12, then a portion of the distal ends of the length-alterable sensor probe or probes and the length alterable sensor probe housing is removed as needed to achieve a proper fit in which the light dome is resting on the outer upward facing surface of the top 20 of the dispenser 12 when the distal ends are adjacent to but not touching the closed bottom of the hollow body 14, such as shown in FIG. 10.

Preferably, score lines are pre-formed at the site of manufacture or are made on site of the customer. In any event, both the length-adjustable probe and the length adjustable probe housing are frangible, and the length adjustment is made by breaking off a piece of the distal ends of the probe or probes and probe housing as needed to obtain a proper fit.

Thus, it is seen that the present universal, portable beverage status indicator enable any dispenser with an inlet opening, whether having other beverage condition displays or none, with a funnel assembly or not, may be retrofitted with a light beverage status indicator that is visible from any angle and clearly visible from any indoor distance.

The invention is universal because it can be used with dispensers of many different types and sizes either with or without length shortening. It is capable of being used without any tools or modification to any dispenser with which it may be used. It is also universal because it is designed to be used with many, if not virtually any make or model dispenser that has an inlet opening at the top of the dispenser, including both faucet-type and airpot type dispensers. In addition, it may be successively used with a series of different or even different makes, models or types of commercial beverage dispensers.

It is portable because it is self-contained with its own power supply, controller, LED lights, etc. and may be installed without the use of any tools or technical knowledge by untrained personnel. A customer may just buy one and use one without any special instructions or technical assistance. All they need to do is to drop it through the inlet opening and let it work. When the dispenser is emptied, the portable status indicator is simply removed from the empty dispenser and then installed in the next dispenser that has been filled, thereby enabling the successive use of a single portable status indicator with a plurality of filled dispenser, instead of requiring one for each dispenser.

While particular embodiments of the universal portable beverage status indicator 10 have been shown and described, it should be appreciated that many other variations may be made without departing from the spirit of the invention. While the invention has been illustrated with reference to a faucet-type, or gravity feed, dispenser, such as described in detail in the first three patents cited above, it should be appreciated that it will work equally well with an airpot type dispenser, such as shown in the last of the four patents cited above. Similarly, while the invention has been illustrated being used with a dispenser having a funnel assembly with a beverage condition sensing down-tube and a beverage condition laterally facing LCD display of the sensed condition, it may be used equally as well with a dispenser that has no funnel, down-tube or display.

Further, while the particular elongate probes enable removing end pieces of the probe assembly without loss of functionality, a probe housing with a plurality of successively spaced apart sensors each independently connected to the controller could also be employed.

While the invention has been disclosed here only with use of a faucet-type dispenser, such as shown and described in the above cited patents and shown in the drawings, the invention is equally capable of being used with an airpot dispenser, such as shown in U.S. Pat. No. 7,798,373 issued Sep. 21, 2010, to Wroblewski et al., which is hereby incorporated by reference.

Further, while in the disclosed embodiment the status of the beverage characteristic being sensed is whether the level of the beverage is above a minimum, or empty, level other characteristics may be sensed in addition to mere beverage presence, such as opacity or turbidity of the beverage. Further, if desired, the sensor probe assembly 52 may be shortened by more than the minimum amount to locate the end of the assembly 52 adjacent the bottom and thereby cause the portable status indicator 10 to provide and indication of empty in advance of actual emptiness to give staff more warning of impending emptiness to enable more time to address removal and replacement with another dispenser that has been just filled with freshly brewed beverage.

The invention claimed is:

1. In a beverage dispenser having an opaque, hollow, insulating body extending between a closed bottom and an open top, a removable top closure including an inlet for receipt of beverage into the hollow body, and a faucet to dispense beverage from the hollow body, the improvement being a beverage status indicator, comprising:
   a light dome overlying the top closure with a body having a bottom, a closed top and surrounding side wall that is at least partly transparent or translucent, said light dome being of sufficient width and height to be easily visible from lateral positions at levels both even with, and beneath, the bottom of the light dome from substantially all sides of the light dome;
   a status indicator lamp to shine light, when automatically energized, upwardly into the light dome and through the at least partly transparent or translucent side wall in substantially all lateral directions;
   an electronics housing with a bottom and a top connected to an underside of the light dome, said electronics housing protectively surrounding a power supply and a controller responsive to at least one condition of the beverage to selectively and automatically energize the status indicator lamp independently of operation of the faucet; and
   a sensor probe assembly with
      an elongate sensor probe housing extending downwardly from the electronics housing and through the inlet to a distal end located adjacent the closed bottom of the hollow body,
      said sensor probe housing protectively surrounding at least one elongate sensor probe for sensing the at least one condition of the beverage to which the controller is responsive with
         a distal end located adjacent to the closed bottom, and
         means for connecting the sensor probe to the controller.

2. The beverage dispenser of claim 1 including
   a funnel assembly with a sensor probe for sensing said beverage condition and carrying a laterally outwardly facing electronic display for displaying the status of said at least one condition of the beverage sensed by the elongate probe in a graphic format different from the form of the status indicator light.

3. In a beverage dispenser having an opaque hollow insulating body extending between a closed bottom and an open top, a removable top closure including an inlet for receipt of beverage into the hollow body, the improvement being a beverage status indicator, comprising:
   a light dome overlying the top closure with a body having a bottom, a closed top and surrounding side wall that is at least partly transparent or translucent, said light dome being of sufficient width and height to be easily visible from lateral positions at levels both even with, and beneath, the bottom of the light dome from substantially all sides of the light dome;
   a status indicator lamp to shine light upwardly into the light dome and through the at least partly transparent or translucent side wall in substantially all lateral directions;
   an electronics housing with a bottom and a too connected to an underside of the light dome, said electronics housing protectively surrounding a rower supply, and a controller responsive to at least one condition of the beverage to selectively energize the status indicator lamp;
   a sensor probe assembly with an elongate sensor probe housing extending downwardly from the electronics housing and through the inlet to a distal end located adjacent the closed bottom of the hollow body and protectively surrounding at least one elongate sensor probe for sensing the at least one condition of the beverage to which the controller is responsive with a distal end located adjacent to the closed bottom, and means for connecting the sensor probe to the controller;
   a funnel assembly with a funnel and a down-tube extending downwardly from the funnel to a distal end adjacent the closed bottom to convey beverage received by the funnel to a location adjacent the closed bottom, and in which
      at least one of the elongate sensor probe housing and the elongate sensor probe is frangible to facilitate shortening by breaking off an end portion and is protectively surrounded by the down-tube.

4. The beverage dispenser of claim 1 in which both of the elongate sensor probe body and the elongate sensor probe are frangible to facilitate breaking at preselected locations along the sensor probe body and sensor probe, and are protectively contained within the down-tube.

5. The beverage dispenser of claim 1 in which at least a substantial portion of the facing side wall of the light dome is translucent with prism-like features that both refract and reflect light to enhance visibility of light from the light dome from substantially all outwardly facing positions relative to the dome when being provided with internal light from the status indicator lamp.

6. The beverage dispenser of claim 3 in which the beverage status indicator includes a retention member located intermediate the top of the electronics housing and the light dome to cover an upwardly facing opening of the inlet and to support the light dome over the open top of the funnel assembly to facilitate easy visibility of the light dome from locations located laterally from the beverage dispenser.

7. The beverage dispenser of claim 1 including a funnel assembly with an open top and in which at least a lower, distal end portion of both the sensor probe housing and the sensor probe are frangible to facilitate removing an end to support the light dome over the open top of the funnel assembly to facilitate easy visibility of the light dome from locations located laterally from the beverage dispenser.

8. In a beverage dispenser having an opaque hollow insulating body extending between a closed bottom and an open top, a removable top closure including an inlet for receipt of beverage into the hollow body, the improvement being a beverage status indicator, comprising:
   a light dome overlying the top closure with a body having a bottom, a closed top and surrounding side wall that is at least partly transparent or translucent, said light dome being of sufficient width and height to be easily visible from lateral positions at levels both even with, and beneath, the bottom of the light dome from substantially all sides of the light dome;

a status indicator lamp to shine light upwardly into the light dome and through the at least partly transparent or translucent side wall in substantially all lateral directions;

an electronics housing with a bottom and a top connected to an underside of the light dome, said electronics housing protectively surrounding a power supply, and a controller responsive to at least one condition of the beverage to selectively energize the status indicator lamp; and a sensor probe assembly with an elongate sensor probe housing extending downwardly from the electronics housing and through the inlet to a distal end located adjacent the closed bottom of the hollow body and protectively surrounding at least one elongate sensor probe for sensing the at least one condition of the beverage to which the controller is responsive, with a distal end located adjacent to the closed bottom, and means for connecting the sensor probe to the controller, and in which at least a lower, distal end portion of both the sensor probe housing and the sensor probe are frangible to facilitate removing an end piece of both the sensor probe housing and the sensor probe by at least one of (a) breaking at any selected location, (b) breaking along a score line, and (c) cutting with a cutting tool.

9. The beverage dispenser of claim 8, in which the elongate probe housing is tapered inwardly downwardly along at least some parts of the elongate probe housing between the upper end and the lower end of the elongate probe housing.

10. The beverage dispenser of claim 1 in which the elongate probe housing has an upper end portion located adjacent the inlet opening and opposite the distal end with walls that are thicker than walls of the distal end portion, said upper end portion being less frangible and stronger than the distal end portion.

11. In a beverage dispenser having an opaque hollow insulating body extending between a closed bottom and an open top, a removable top closure including an inlet for receipt of beverage into the hollow body, the improvement being a beverage status indicator, comprising:

a light dome overlying the top closure with a body having a bottom, a closed top and surrounding side wall that is at least partly transparent or translucent, said light dome being of sufficient width and height to be easily visible from lateral positions at levels both even with, and beneath, the bottom of the light dome from substantially all sides of the light dome;

a status indicator lamp to shine light upwardly into the light dome and through the at least partly transparent or translucent side wall in substantially all lateral directions;

an electronics housing with a bottom and a top connected to an underside of the light dome, said electronics housing protectively surrounding a power supply, and a controller responsive to at least one condition of the beverage to selectively energize the status indicator lamp; and a sensor probe assembly with an elongate sensor probe housing extending downwardly from the electronics housing and through the inlet to a distal end located adjacent the closed bottom of the hollow body and protectively surrounding at least one elongate sensor probe for sensing the at least one condition of the beverage to which the controller is responsive with a distal end located adjacent to the closed bottom, and means for connecting the sensor probe to the controller, and in which the lower distal end portion of the sensor stem probe is scored with a groove at a location near a lower portion of the sensor probe to facilitate shortening of the sensor stem probe by manually breaking off a lower end portion of the sensor stem at the score line.

12. The beverage dispenser of claim 1 in which a lower portion of the sensor probe is more frangible than an upper portion to facilitate breaking off part of the lower portion.

13. In a beverage dispenser having an opaque hollow insulating body extending between a closed bottom and an open top, a removable top closure including an inlet for receipt of beverage into the hollow body, the improvement being a beverage status indicator, comprising:

a light dome overlying the top closure with a body having a bottom, a closed top and surrounding side wall that is at least partly transparent or translucent, said light dome being of sufficient width and height to be easily visible from lateral positions at levels both even with, and beneath, the bottom of the light dome from substantially all sides of the light dome;

a status indicator lamp to shine light upwardly into the light dome and through the at least partly transparent or translucent side wall in substantially all lateral directions;

an electronics housing with a bottom and a top connected to an underside of the light dome, said electronics housing protectively surrounding a power supply, and a controller responsive to at least one condition of the beverage to selectively energize the status indicator lamp;

a sensor probe assembly with an elongate sensor probe housing extending downwardly from the electronics housing and through the inlet to a distal end located adjacent the closed bottom of the hollow body and protectively surrounding at least one elongate sensor probe for sensing the at least one condition of the beverage to which the controller is responsive with a distal end located adjacent to the closed bottom, and means for connecting the sensor probe to the controller, and in which a lower portion of the sensor probe is frangible and scored with a groove at a location near a lower portion of the sensor stem to facilitate shortening of the sensor stem probe by manually breaking off a lower end portion of the sensor probe.

14. The beverage dispenser of claim 1 in which the sensor stem has a body within which the sensor probe is protectively surrounded.

15. The beverage dispenser of claim 1 in which the sensor probe is elongate and protectively contained within a body of the sensor stem.

16. The beverage dispenser of claim 1 including another sensor probe carried by the sensor stem adjacent the closed bottom and spaced from the one sensor probe.

17. The beverage dispenser of claim 1 in which the electronics housing has a timer to selectively cause the status indicator lamp to blink on and off to indicate at least one status condition.

18. The beverage dispenser of claim 1 including
another status indicator light having a color different from a color of the one status indicator lamp, and the controller selectively energizes only one of the one status indicator lamp and the other status indicator lamp in response to different status conditions sensed by the sensor probe.

19. The beverage dispenser of claim 1 in which
the sensor probe senses beverage level within the hollow dispenser body, and
the funnel assembly has a display for graphically displaying the beverage level.

20. For use with a beverage dispenser having an opaque hollow insulating body with a surrounding sidewall extending between a closed bottom and a top with an inlet for receipt of beverage into the hollow body and a faucet for dispensing beverage from the hollow body, the improvement being a beverage status indicator assembly, comprising:
a status indicator light dome with an interior defined by a closed top and surrounding side wall with at least a portion that is translucent or transparent to enable the transmission of light within the light dome laterally outwardly from the surrounding side wall in substantially all lateral directions;
a beverage status lamp for providing light within the interior of the status indicator light dome when energized to transmit light from within the dome in substantially all lateral directions;
an electronics housing with a power supply and a controller responsive to at least one condition of the beverage to selectively automatically energize the status indicator lamp independently of operation of the faucet to indicate beverage status;
a frangible sensor assembly mounted to and extending downwardly from the electronics housing, said frangible sensor assembly including
an elongate frangible sensor probe housing extending downwardly from the electronics housing to a lower end portion adjacent the bottom of the hollow body, said lower end portion being frangible to enable shortening of the lower end portion, and
an elongate frangible sensor probe connected with the controller and protectively mounted within and protectively, substantially surrounded by, at least the frangible lower end portion of the frangible sensor stem housing and connected to the electronics housing,
said elongate frangible sensor probe having a bottom portion located within the lower end portion of the elongate sensor probe housing that is also frangible to facilitate shortening of the bottom portion of the frangible sensor probe by manual breaking; and
means for supporting the status light dome above the top with the frangible sensor probe housing extending downwardly through the inlet into the hollow body from adjacent the top of the hollow body to adjacent the bottom of the hollow body.

21. For use with a beverage dispenser having an opaque hollow insulating body with a surrounding sidewall extending between a closed bottom and a too with an inlet for receipt of beverage into the hollow body, the improvement being a beverage status indicator assembly, comprising:
a status indicator light dome with an interior defined by a closed top and surrounding side wall with at least a portion that is translucent or transparent to enable the transmission of light within the light dome laterally outwardly from the surrounding side wall in substantially all lateral directions; a beverage status lamp for providing light within the interior of the status indicator light dome when energized to transmit light from within the dome in substantially all lateral directions;
an electronics housing with a power supply and a controller responsive to at least one condition of the beverage to selectively energize the status indicator lamp to indicate beverage status;
a frangible sensor assembly mounted to and extending downwardly from the electronics housing, said frangible sensor assembly including an elongate frangible sensor probe housing extending downwardly from the electronics housing to a lower end portion adjacent the bottom of the hollow body, said lower end portion being frangible to enable shortening of the lower end portion, and an elongate frangible sensor probe connected with the controller and protectively mounted within and protectively, substantially surrounded by, at least the frangible lower end portion of the frangible sensor stem housing and connected to the electronics housing, said elongate frangible sensor probe having a bottom portion located within the lower end portion of the elongate sensor probe housing that is also frangible to facilitate shortening of the bottom portion of the frangible sensor probe; and means for supporting the status light dome above the top with the frangible sensor probe housing extending downwardly through the inlet into the hollow body from adjacent the top of the hollow body to adjacent the bottom of the hollow body, and in which the frangible lower end portion of the elongate frangible sensor probe housing has at least one of
(a) a groove scored in the lower end portion of the sensor stem housing to facilitate manual breaking off of a part of the lower end portion of the stem housing at the location of the scored groove, or
(b) a plurality of grooves scored in the lower end portion of the of the probe housing at a plurality of locations spaced along the lower end portion to facilitate breaking off a part of the lower end portion of the probe housing at said plurality of locations.

22. The beverage status indicator assembly of claim 21 in which the frangible lower end portion of the elongate frangible sensor probe housing has at least one of
(a) a groove scored in the lower end portion of the elongate frangible sensor probe to facilitate manual breaking off of a part of the lower end portion of the frangible sensor probe at the location of the scored groove, or
(b) a plurality of grooves scored in the lower end portion of the of the frangible sensor probe at a plurality of locations spaced along the lower end portion of the frangible sensor probe to facilitate breaking off a part of the lower end portion of the elongate frangible sensor probe housing at said plurality of locations spaced along the sensor probe.

23. The beverage status indicator assembly of claim 22 in which for every scored groove in the elongate frangible sensor probe housing there is a corresponding scored groove in the elongate frangible sensor probe.

24. The beverage status indicator assembly of claim 20 including another elongate frangible sensor probe connected with the controller and protectively mounted within and protectively, substantially surrounded by, at least the frangible lower end portion of the frangible sensor probe housing and connected to the electronics housing, said other elongate frangible sensor probe having a bottom portion located within the lower end portion of the elongate sensor stem housing that is also frangible to enable shortening of the bottom portion of the frangible sensor probe.

25. For use with a beverage dispenser having an opaque hollow insulating body with a surrounding sidewall extending between a closed bottom and a top with an inlet for receipt of beverage into the hollow body, the improvement being a beverage status indicator assembly, comprising:
a status indicator light dome with at least a portion that is translucent or transparent to enable the transmission of light within the light dome laterally outwardly in substantially all lateral directions;
a beverage status lamp for providing light within the interior of the status indicator light dome when energized which passes through the translucent or transparent light dome in substantially all lateral directions;
an electronics housing with a power supply and a controller responsive to at least one condition of the beverage to selectively energize the status indicator lamp to indicate beverage status;
a frangible sensor assembly mounted to and extending downwardly from the electronics housing, said frangible sensor assembly including an elongate frangible sensor probe housing extending downwardly from the electronics housing to a lower end portion adjacent the bottom of the hollow body, said lower end portion being frangible to enable shortening of the lower end portion, and an elongate frangible sensor probe connected with the controller and protectively mounted within and protectively, substantially surrounded by, at least the frangible lower end portion of the frangible sensor stem housing and connected to the electronics housing, said elongate frangible sensor probe having a bottom portion located within the lower end portion of the elongate sensor probe housing that is also frangible to facilitate shortening of the bottom portion of the frangible sensor probe; another elongate frangible sensor probe connected with the controller and protectively mounted within and protectively, substantially surrounded by, at least the frangible lower end portion of the frangible sensor probe housing and connected to the electronics housing, said other elongate frangible sensor probe having a bottom portion located within the lower end portion of the elongate sensor stem housing that is also frangible to enable shortening of the bottom portion of the frangible sensor probe; means for supporting the status light dome above the top with the frangible sensor probe housing extending downwardly through the inlet into the hollow body from adjacent the top of the hollow body to adjacent the bottom of the hollow body; and in which each of the one and the other elongate frangible sensor probes have one of
(a) a scored groove in the lower portion of each that are aligned with each other to facilitate breaking off bottom end pieces of the one and the other elongate frangible sensor probes of equal length, or
(b) a plurality of scored grooves in the lower portion of each that are aligned with each other, respectively, to facilitate breaking off bottom end pieces of equal length from both the one and the other elongate frangible sensor probes.

26. The beverage status indicator of claim 25 in which the elongate frangible sensor probe housing has a scored groove for each pair of scored grooves in the one and the other elongate frangible sensor probes.

27. The beverage status indicator of claim 20 in which the beverage within the hollow body has a level, the elongate frangible sensor probe senses the beverage level, the controller responds to the frangible sensor probe sensing of the different status conditions of the level by controlling the beverage status lamp
(a) flash the lamp at a relatively slow rate when the level is above an empty level,
(b) flash the lamp at a relatively fast rate that is substantially faster than the relative slow rate when the level is beneath at or beneath an empty level, and
(c) remove energy from the lamp so that no light is emitted from the status indicator light dome.

28. The beverage status indicator assembly of claim 20 including another beverage status lamp that produces light of a color that is different from a color of the one beverage status lamp, and in which the controller responds to empty and non-empty status conditions of the beverage within the hollow body to energize the one beverage status lamp or the other beverage status lamp, respectively.

29. The beverage status indicator assembly of claim 20 in combination with the beverage dispenser, said status indicator assembly being mounted to the beverage dispenser with the status indicator light dome being mounted above the top and the inlet opening and the elongate frangible sensor probe housing extending through the inlet opening and into the hollow body to a location adjacent the closed bottom.

* * * * *